United States Patent [19]
Riedel et al.

[11] Patent Number: 5,384,804
[45] Date of Patent: Jan. 24, 1995

[54] HEAT SHIELDING CLADDING

[75] Inventors: Hartmut Riedel, Stemwede; Adolf Schultz, Glinde, both of Germany

[73] Assignee: Oscar Gossler KG (GmbH & Co.), Reinbek, Germany

[21] Appl. No.: 962,800

[22] PCT Filed: Apr. 22, 1992

[86] PCT No.: PCT/EP92/00886

§ 371 Date: Dec. 24, 1992

§ 102(e) Date: Dec. 24, 1992

[87] PCT Pub. No.: WO92/19926

PCT Pub. Date: Nov. 12, 1992

[30] Foreign Application Priority Data

Apr. 24, 1991 [DE] Germany ............... 9105022[U]
Sep. 11, 1991 [DE] Germany ............... 9111248[U]

[51] Int. Cl.6 ............................................. F27D 1/00
[52] U.S. Cl. ......................... 373/137; 373/71; 373/75; 373/155; 373/162; 29/456; 52/506; 52/509
[58] Field of Search ................. 373/71, 72, 73, 137; 110/336, 331, 334; 432/247, 248, 251, 252; 52/506, 509; 29/525.1, 456, 432

[56] References Cited

U.S. PATENT DOCUMENTS

| | | |
|---|---|---|
| 2,120,133 | 6/1938 | Kohler ................................. 52/479 |
| 3,832,815 | 9/1974 | Balaz et al. ............................ 52/227 |
| 4,177,616 | 12/1979 | Lampert ................................ 52/509 |
| 4,222,337 | 9/1980 | Christiansen ...................... 110/336 |
| 4,437,286 | 3/1984 | Maguire ............................... 52/506 |
| 4,478,022 | 10/1984 | Wilkinson et al. ................... 52/509 |
| 4,677,731 | 7/1987 | Sommerer et al. ................ 29/525.1 |
| 5,014,482 | 5/1991 | Alexander ............................ 52/506 |

FOREIGN PATENT DOCUMENTS

| | | |
|---|---|---|
| 2216843 | 2/1973 | France . |
| 2507594 | 12/1982 | France . |
| 1045585 | 2/1956 | Germany . |
| 2831151 | 7/1978 | Germany . |
| 2159253 | 11/1985 | United Kingdom . |

*Primary Examiner*—Bruce A. Reynolds
*Assistant Examiner*—Tu Hoang
*Attorney, Agent, or Firm*—Robert W. Becker & Associates

[57] ABSTRACT

A heat shielding cladding for walls, ceilings, or similar surfaces, especially of industrial furnaces, including butted together parallelepipedal modules that are secured to the wall and comprise a plurality of held together and compacted fiber mat webs that are prestressed in a direction parallel to the wall. Adjacent modules are held together in a permanently flexible bond on non-prestressed sides thereof by at least one filamentary, temperature-resistant binder that is guided, without kinking, from a surface of the heat shielding cladding that is remote from the wall to the wall.

13 Claims, 11 Drawing Sheets

FIG. 12
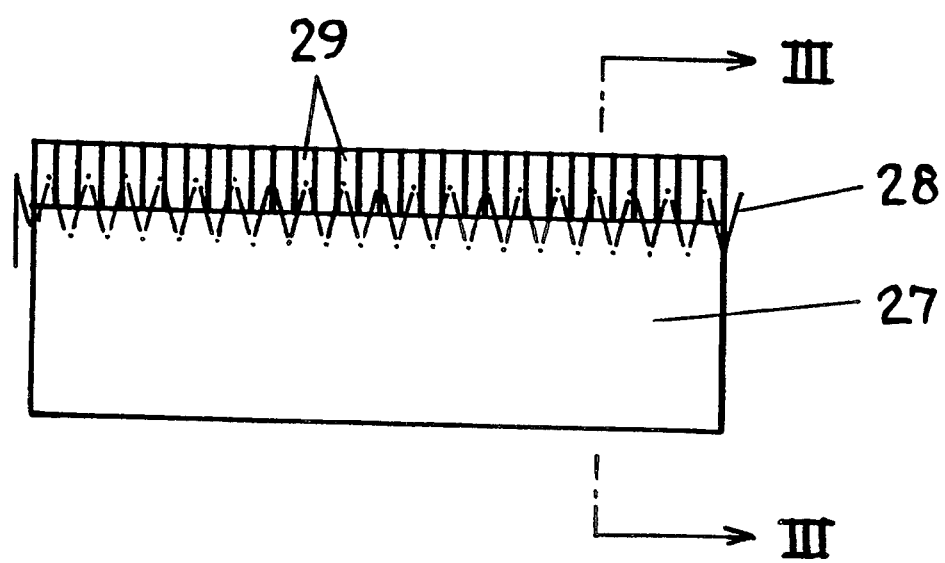
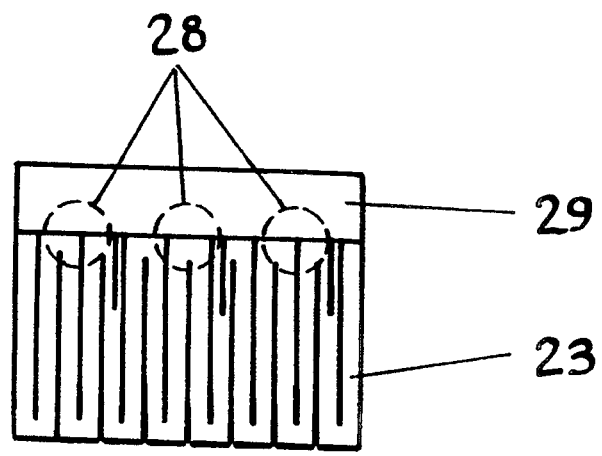
FIG. 13

HEAT SHIELDING CLADDING

BACKGROUND OF THE INVENTION

The present invention relates to a heat shielding or protective cladding for walls, ceilings, and similar surfaces (wall means), especially of industrial furnaces, with the cladding being formed from butted together parallelepipedal bodies (modules) that are secured to the wall means and comprise a plurality of held together and compacted fiber mat webs that are prestressed in a direction parallel to the wall means.

With such a heat shielding cladding, which is comprised of modules, for industrial furnaces or other high temperature apparatus, the modules are pressed together, i.e. are held under prestress, before and during the time that they are mounted on the wall means, by clamping elements such as bands, cardboard boxes, or pieces of wood. After a surface or wall means that is to be insulated or covered has been completely equipped with such modules, the clamping elements are loosened, whereupon the modules swell or expand and the gaps or seams that resulted during assembly between the individual modules are closed. In this connection, the use of fiber mat webs of refractory material such as metal oxide compounds has proven to be satisfactory as insulating material during the construction of the modules because such materials can withstand high temperatures. However, the problem with these heat shielding claddings is that ceramic fibers contract when they are exposed to high temperatures for long periods of time. This leads to the formation of gaps, especially at the seams between those sides of adjacent modules in the heat shielding cladding that are not under prestress. These gaps can extend all the way from the surface of the heat shielding cladding to the wall means that are to be insulated. In order to prevent damage to the wall means due to thermal penetration at the gaps, it is essential to continuously inspect the heat shielding cladding and to eliminate the gaps by filling them with insulating material.

It is therefore an object of the present invention to embody a heat shielding cladding of the aforementioned type that comprises modules of fiber mat webs in such a way that the cladding ensures an excellent insulating effect while preventing the formation of gaps.

SUMMARY OF INVENTION

This object is inventively realized in that adjacent modules are held together in a permanently flexible bond on the non-prestressed sides by at least one filamentary, temperature-resistant connecting or binding means that, without kinking, is guided from the surface of the heat shielding cladding to the wall means.

A permanently flexible bond is obtained between the modules as a consequence of the inventive connection of adjacent modules, at their non-prestressed sides, with a filamentary, temperature-resistant binding means that is guided without kinking, that is expediently made of mineral fibers, especially ceramic fibers, and that extends helically through the modules on both sides of a butt joint or plane of separation. During contraction of the modules under the effect of temperature, the permanently flexible bond reliably connects the gaps between the non-prestressed sides of the modules that result during assembly. Since in this way a thermal penetration through the insulation need not be feared, it is possible to dispense with an inspection of the inventive heat shielding cladding for the formation of gaps, as a consequence of which a high temperature insulation of industrial furnaces or the like that is essentially maintenance free is obtained. The danger of a formation of gaps, and hence of thermal penetration, can also be counteracted by providing the modules with slits that extend from the hot side in a direction parallel to the non-prestressed sides thereof in order in this way to distribute the contraction of each module to a plurality of small gaps.

The loosening and removal of the clamping elements after the modules have been secured to the furnace surface that is to be insulated is laborious due to the swelling of the modules. Furthermore, the necessary removal of the clamping elements also means that the assembly gap or seam between the modules cannot be kept as small as desired since access to the clamping elements not only becomes more difficult but actually becomes impossible. It has therefore proven to be satisfactory pursuant to an expedient further embodiment of the present invention to construct the heat shielding cladding of modules where a filamentary connecting or binding means of a non heat-resistant, and preferably organic, material extends through at least two of the compacted fiber mat webs of the modules, with this binding means interconnecting the fiber mat webs and holding them together as a prestressed parallelepipedal body. As a consequence of this inventive interconnection of the fiber mat webs of a module with a filamentary binding means that is guided without kinking, and preferably helically, through the fiber mat webs, the complicated separation and removal of the clamping elements after the modules have been mounted on the surface that is to be insulated is eliminated because the organic binding means is not heat resistant and therefore burns under the influence of higher temperatures, as a result of which the prestressed modules swell or expand and the gaps formed between the modules due to the assembly process are closed. These gaps can be kept very small since after assembly of the modules access to the clamping elements is no longer required, as a result of which a forcing open of the gaps between the modules due to contraction of the fiber material under the effect of heat is further counteracted, and the freedom of the inventive heat shielding cladding from maintenance is improved. The formation of gaps in the seams between the modules can be counteracted even further by providing the hot side of the modules with slits that extend parallel to the non-prestressed sides.

The characteristics of the inventive heat shielding cladding, such as in particular the resistance to high temperatures, are a function of the material of the fiber mat webs from which the modules for the cladding are produced. In this connection, the material costs increase as the temperature resistance of the fiber mat webs of the modules increases, so that claddings of wall means in high temperature furnaces are very expensive. To reduce these costs, pursuant to another exemplary embodiment of the present invention the modules comprise a plurality of fiber mat webs that are held together to form a parallelepipedal base member, and that surface of the parallelepipedal base member that faces away from the wall that is to be clad is provided with at least one further member that is made of fiber mat webs having a different quality, with this further member being connected to the surface with a filamentary, heat-resistant binding means that is guided without kinking and is preferably made of ceramic fibers. As a consequence of this inventive construction of the module from two members of fiber mat webs having different qualities or compositions, it is not only possible to make that part of the module that is exposed to the surface atmosphere of a material that is of a higher grade than is the other portion of the module that is adjacent to the wall means of the furnace, thereby making it possible to achieve considerable savings in material costs for the module. This inventive interconnection of the two members of the module with the filamentary connecting or binding means, which is expediently helically guided through the module, furthermore offers the advantage that stresses that occur at the point of connection of the two members and that is based on the different material compositions of the fiber mat webs, do not adversely affect the strength of the connection.

BRIEF DESCRIPTION OF THE DRAWINGS

Specific embodiments of the inventive heat shielding cladding will be described with the aid of the drawings, in which:

FIG. 12 is a schematic sectional view of the module of FIG. 10 taken along the line 12—12 in FIG. 10 and to a different scale, FIG. 13 is a schematic sectional view of the module of FIG. 10 taken along the line 13–13 in FIG. 12.

DESCRIPTION OF PREFERRED EMBODIMENTS

Figure 1:
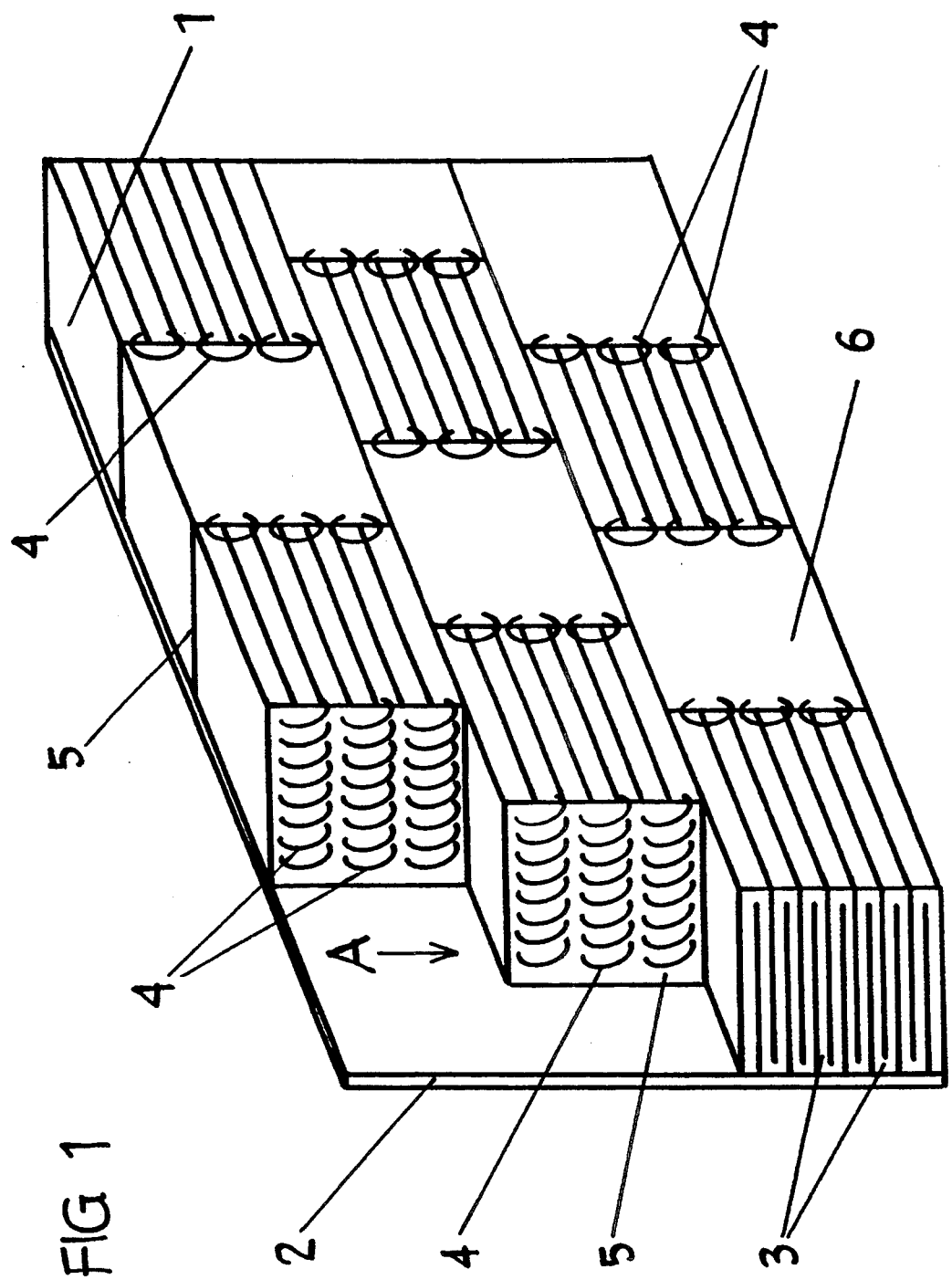
FIG. 1 is a schematic perspective view of a first exemplary embodiment of the inventive heat shielding cladding.
Figure 2:
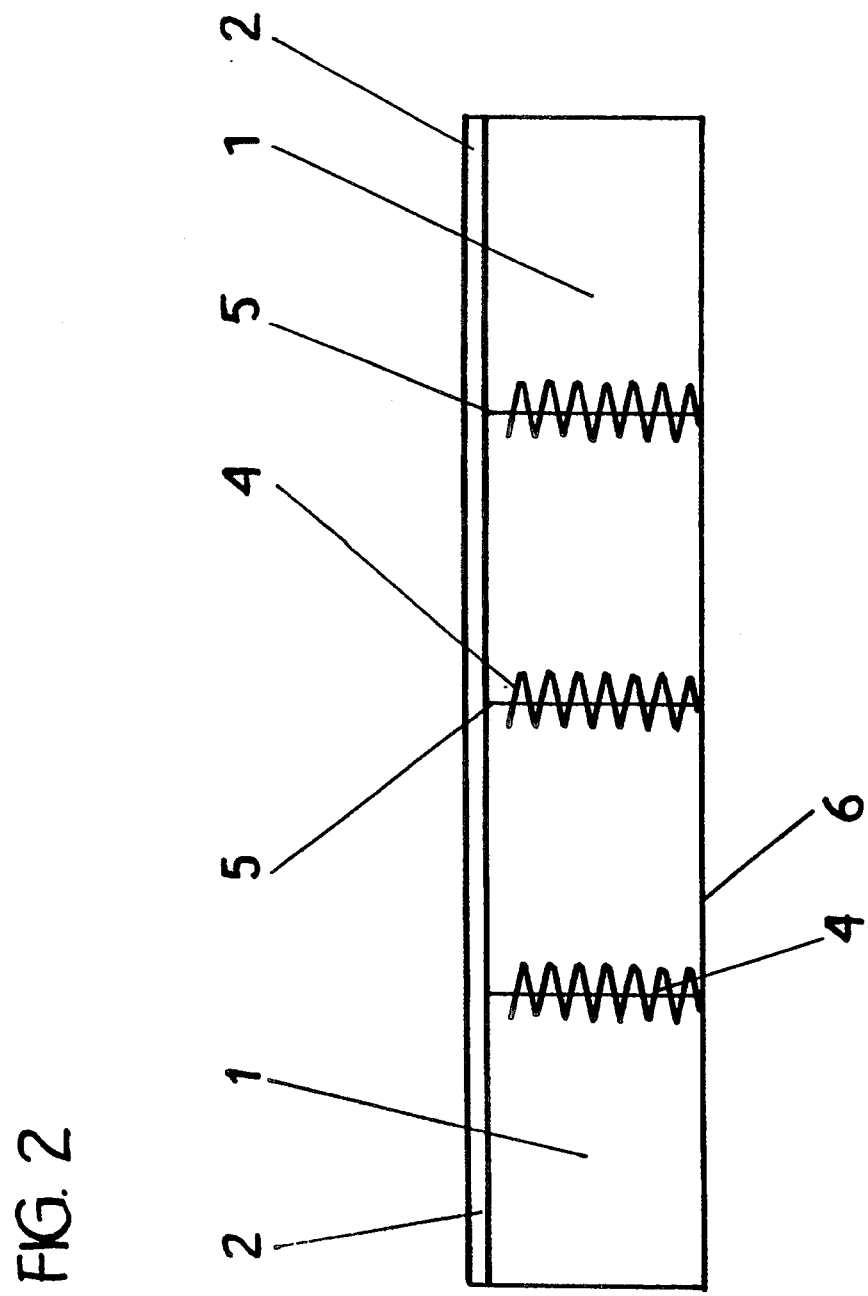
FIG. 2 is a schematic top view of the heat shielding cladding of FIG. 1 to a different scale.

The heat protective or shielding cladding illustrated in FIGS. 1 and 2 comprises a plurality of parallelepipedal bodies or modules 1 that are secured to a wall means 2 of an industrial furnace; the modules are secured to the wall means, which is to be insulated or covered, by known elements (not shown). The modules 1, from which the tensioning elements that hold them under prestress have been removed, comprise a plurality of fiber mat webs 3 that are prestressed parallel to the wall means 2 in the direction of the arrow A. The adjacent and abutting modules 1 are held together on the non-prestressed sides 5 in a permanently flexible bond by helically guided, filamentary and temperature-resistant connecting or binding means 4. The binding means 4 extend from the hot side or surface 6 of the heat shielding cladding to the wall means 2.

Figure 3:
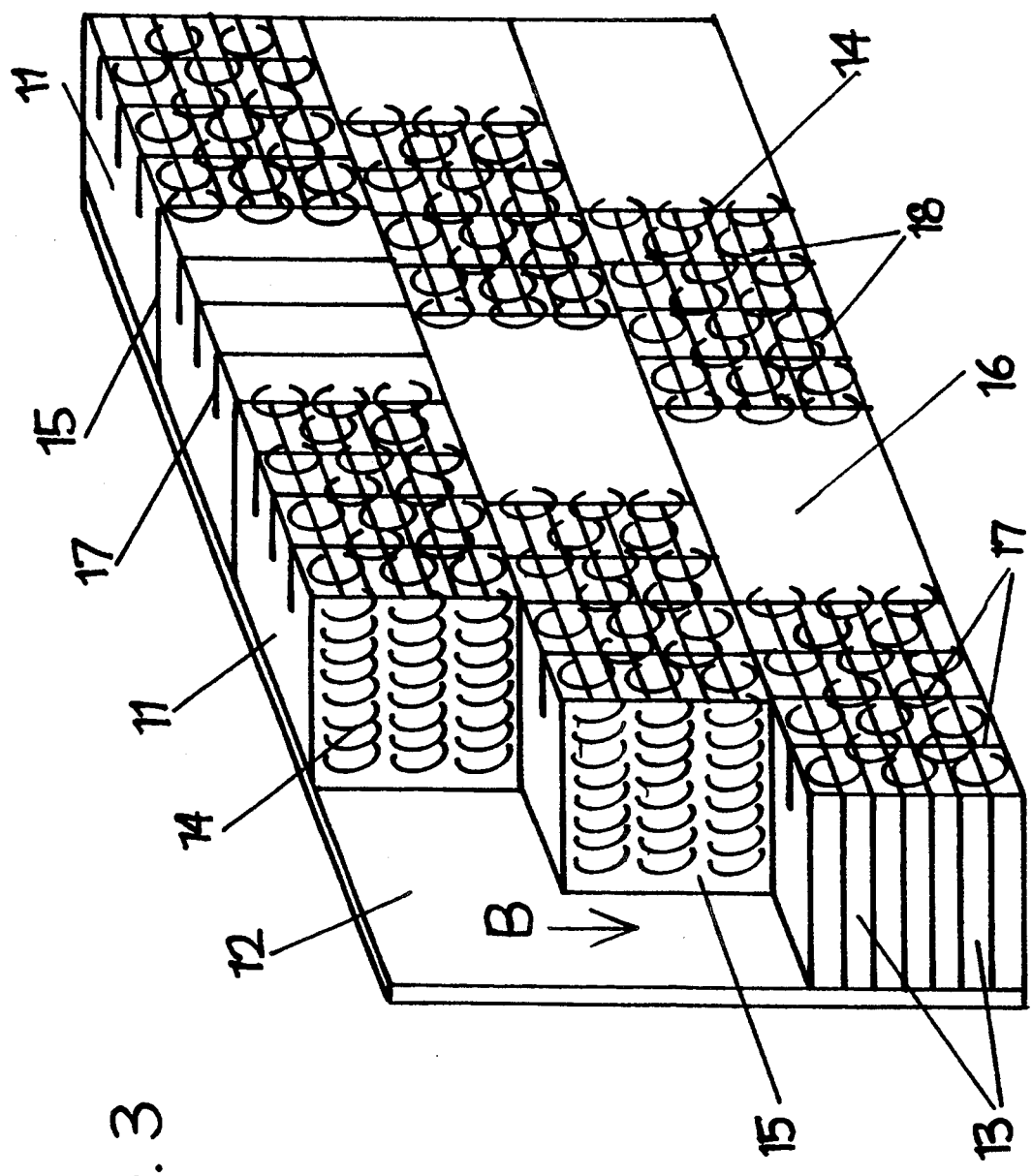
FIG. 3 is a schematic perspective view of another exemplary embodiment of the inventive heat shielding cladding.
Figure 4:
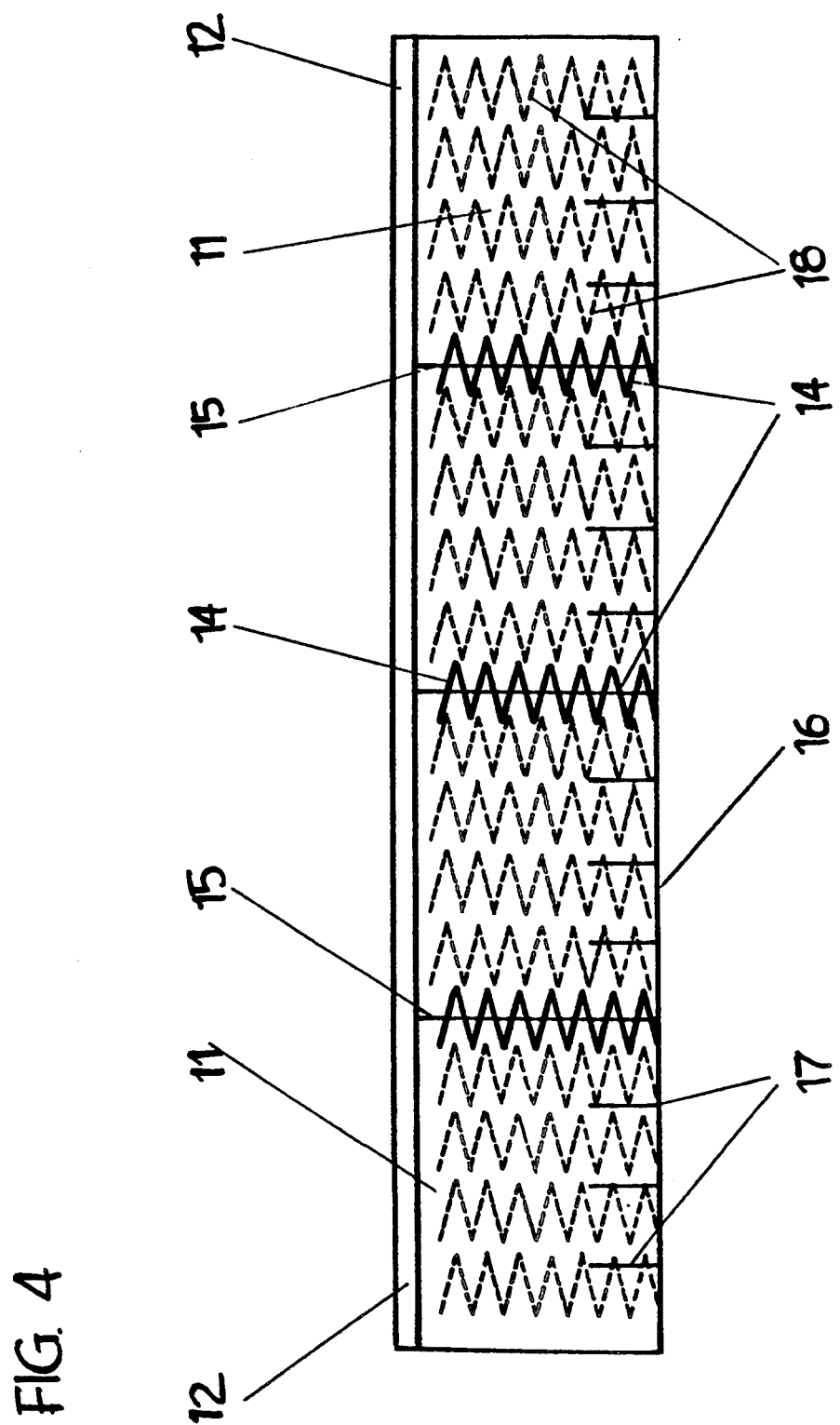
FIG. 4 is a schematic top view of the heat shielding cladding of FIG. 3 to a different scale.
Figure 7:
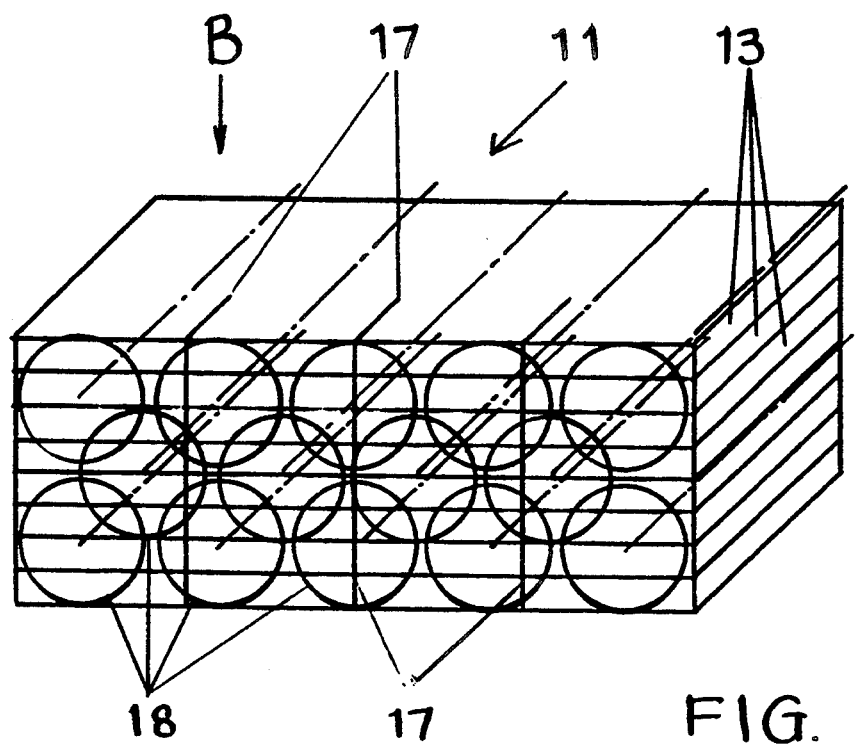
FIG. 7 is a schematic perspective view of one of the modules of the heat shielding cladding of FIGS. 3 and 4.
Figure 8:
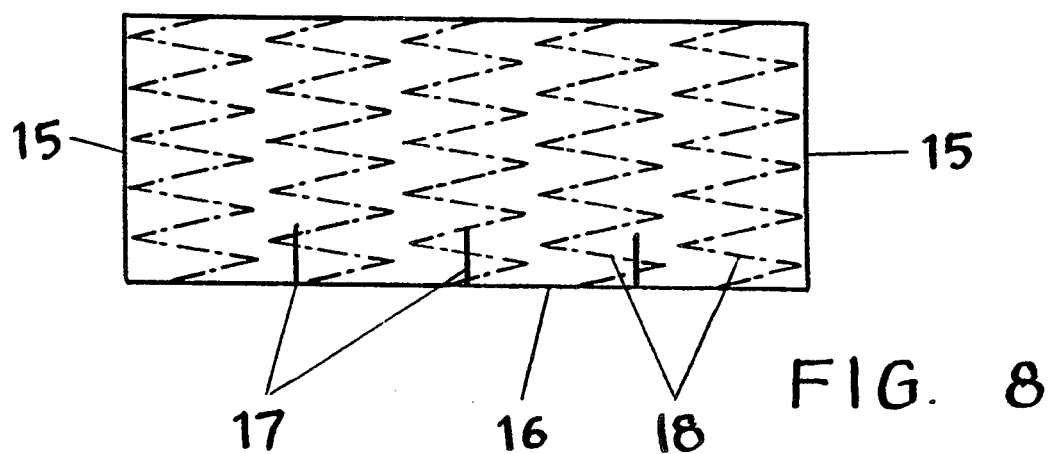
FIG. 8 is a schematic top view of the module of FIG. 7.
Figure 9:
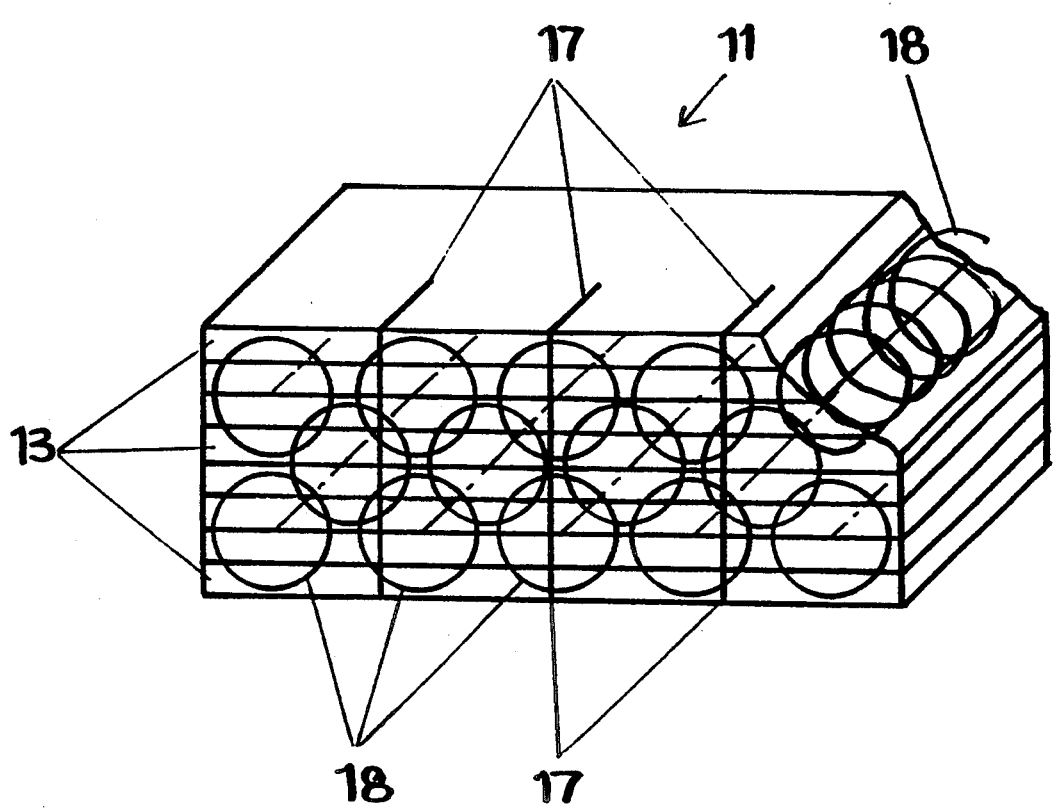
FIG. 9 is a schematic perspective and partially broken away view of the module of FIGS. 7 and 8 to a different scale.
Figure 10:
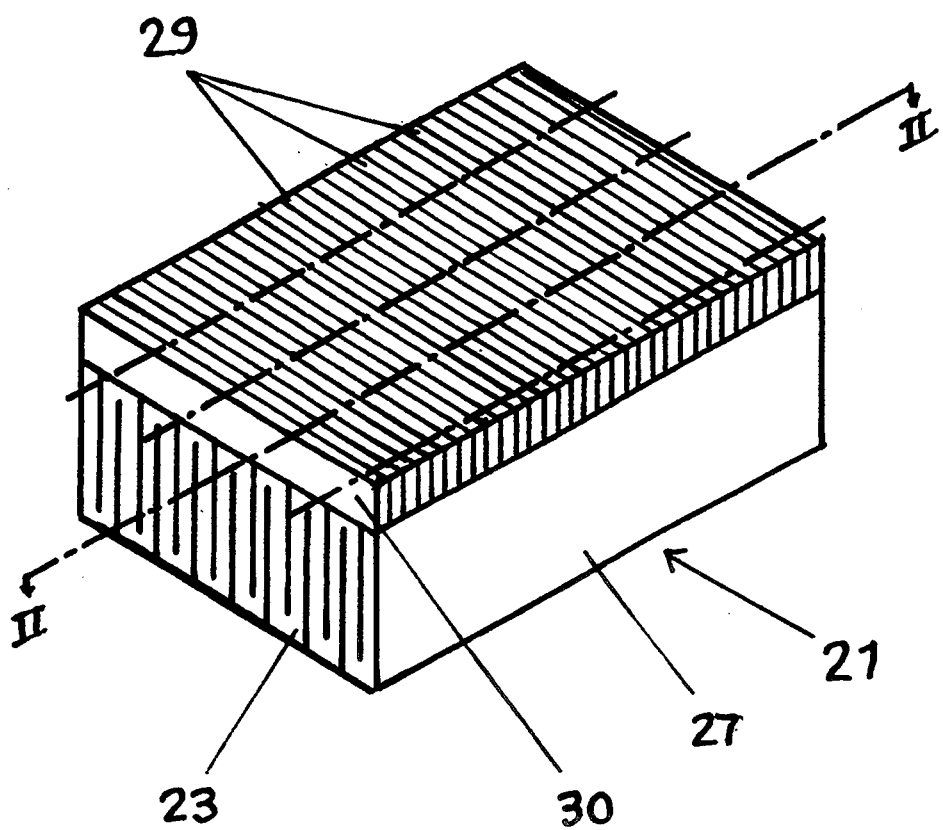
FIG. 10 is a schematic perspective view of one of the modules of the heat shielding cladding of FIGS. 5 and 6.
Figure 11:
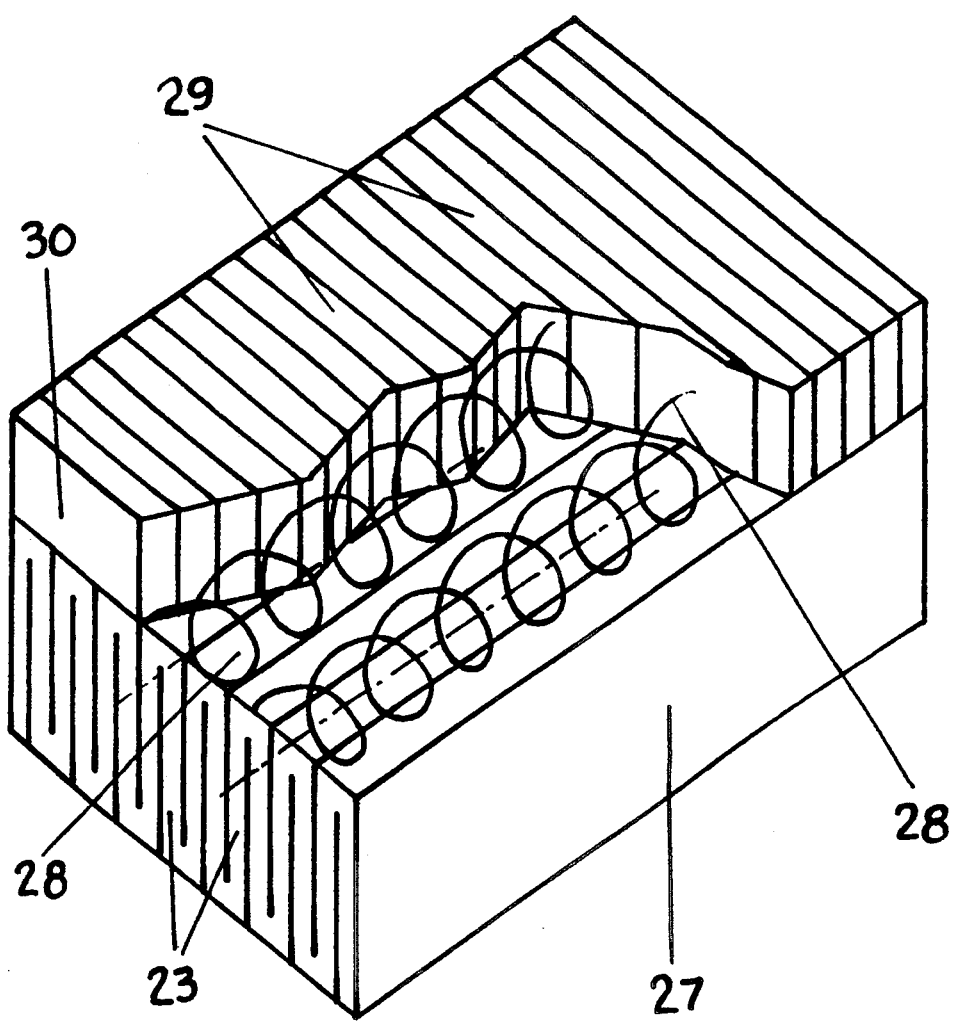
FIG. 11 is a schematic perspective and partially broken away view of the module of FIG. 10 to a different scale.

For the heat shielding cladding illustrated in FIGS. 3 and 4, again a plurality of parallelepipedal bodies or modules 11 are butted together and are secured to a wall means 12 of an industrial furnace that is to be insulated or covered by known elements ( not shown ). These modules 11 (see also FIGS. 7 to 9) also comprise a plurality of superimposed fiber mat webs 13 that are compressed in a press by 25 to 40% and are prestressed in the direction of the arrow B. In this prestressed state, the fiber mat webs 13 are interconnected with a filamentary connecting or binding means 18 of organic material that is guided without kinking, so that after the press is relaxed, the modules 11 retain their shape. The abutting modules 11 of the heat shielding cladding that are prestressed in this manner are, as described above in conjunction with FIGS. 1 and 2, held together on the non-prestressed sides 15 in a permanently flexible bond with a temperature-resistant filamentary connecting or binding means 14. On the hot side or surface 16 of the heat shielding cladding, the modules 11 are provided with slits 17 that extend parallel to the non-prestressed sides 15; these slits are provided at intervals of approximately 50 to 100 mm, and extend about ¼ to ⅓ of the way into the module 11.

Figure 5:
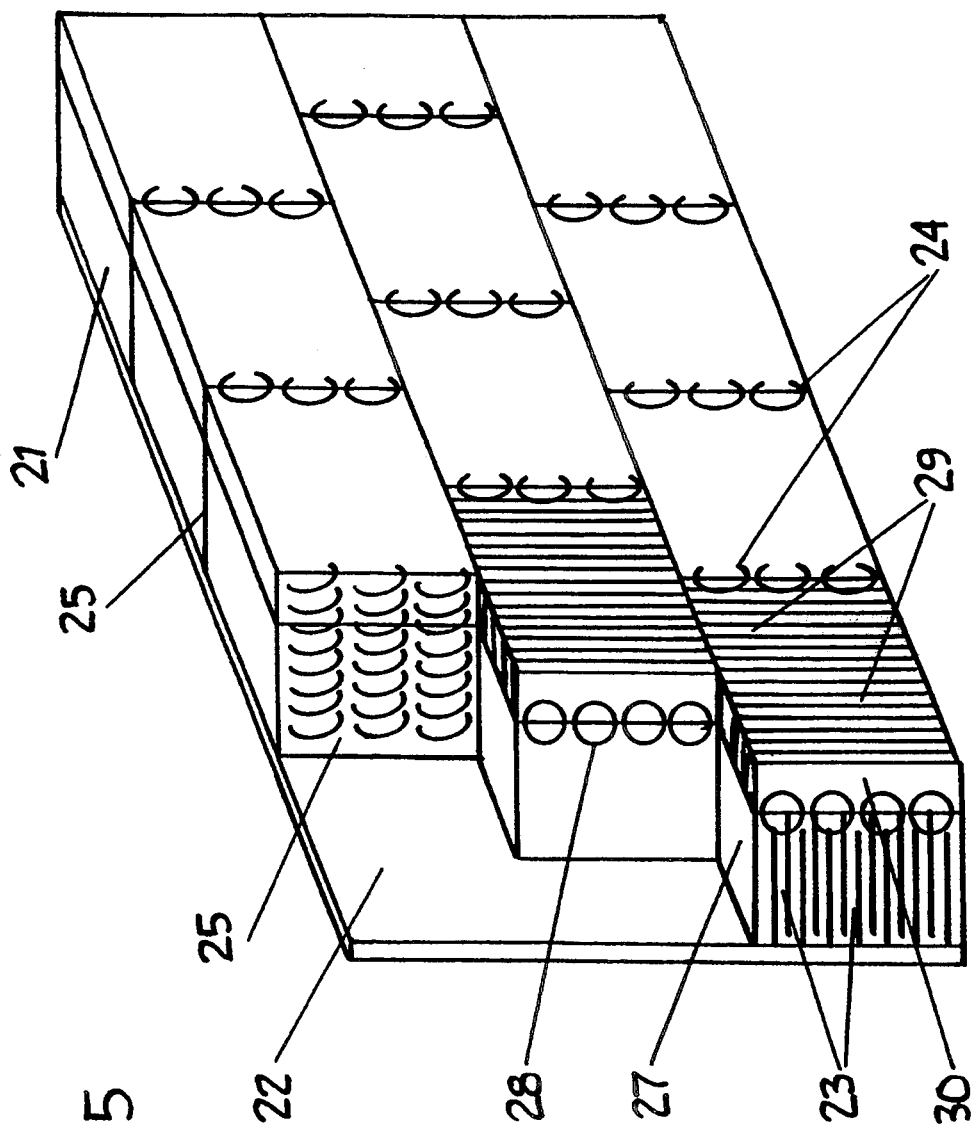
FIG. 5 is a schematic perspective view of a further exemplary embodiment of the inventive heat shielding cladding.
Figure 6:
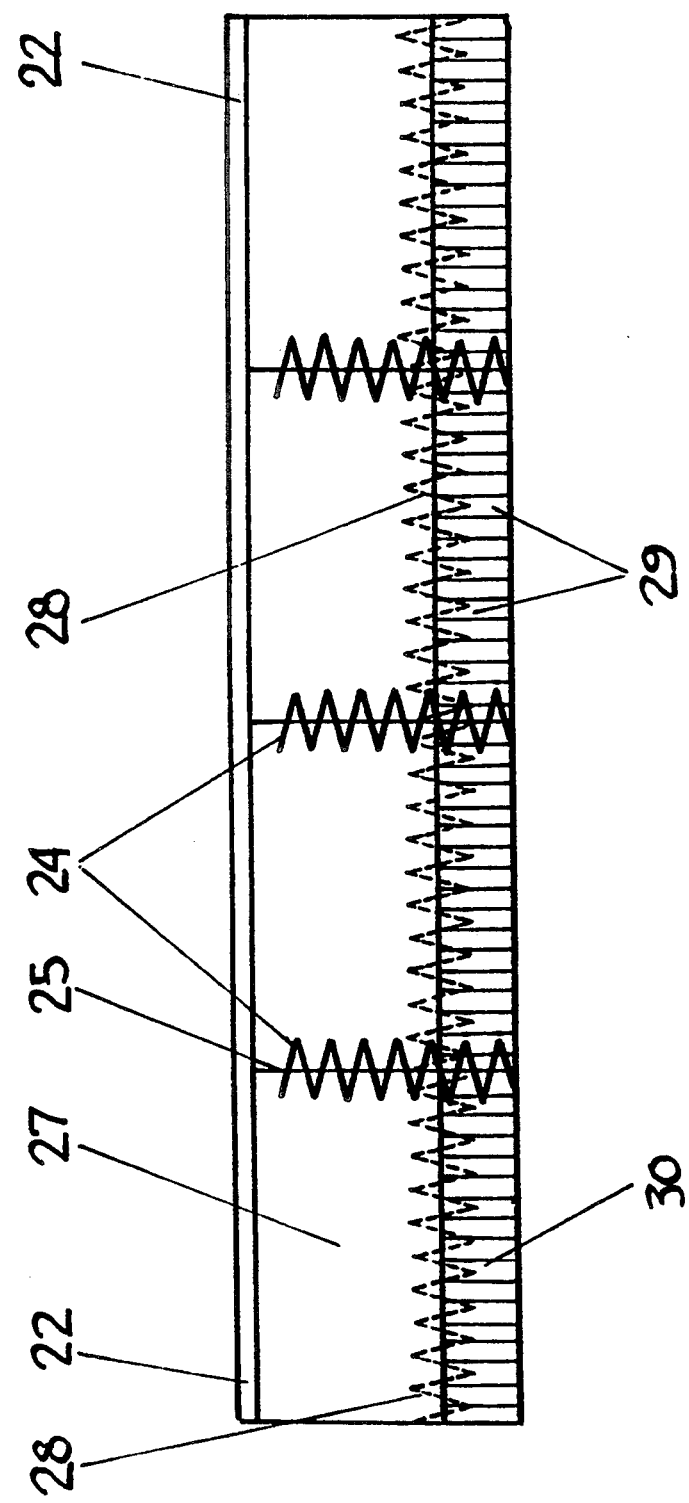
FIG. 6 is a schematic top view of the heat shielding cladding of FIG. 5 to a different scale.

In the heat shielding cladding shown in FIGS. 5 and 6, to insulate or cover a wall means 22 of a furnace again a plurality of parallelepipedal bodies or modules 21 of fiber mat webs 23 and 29 are secured to the wall means 22 by non-illustrated elements and are held together at abutting sides 25 in the aforementioned manner in a permanently flexible bond with a temperature-resistant filamentary connecting or binding means 24. The module 21 comprises a base member 27 of fiber mat webs 23 that are folded in a zig-zagged manner. Disposed transverse to the direction of fold of the fiber mat webs 23, on that surface of the base member 27 that faces the interior of the furnace, are fiber mat webs 29 that overlap the folds; these further fiber mat webs are combined in a non-illustrated manner to form a second member 30 and are arranged in such a way that a narrow side of the fiber mat webs 29 rests against the base member 27. The base member 27 and the second member 30 are secured to one another by a filamentary and heat-resistant connecting or binding means 28 that is helically guided through these members 27 and 30. In this connection, the fiber mat webs 23 of the base member 27 and the fiber mat webs 29 of the second member 30 have different properties.

The present invention is, of course, in no way restricted to the specific disclosure of the specification and drawings, but also encompasses any modifications within the scope of the appended claims.

What we claim is:

1. In a heat shielding cladding for wall means of high temperature apparatus, including butted together parallelepipedal modules that are secured to said wall means and each comprise a plurality of held together and compacted fiber mat webs that are prestressed in a direction parallel to said wall means, the improvement wherein:

adjacent ones of said modules are held together in a permanently flexible bond, on sides thereof that extend parallel to said direction, by at least one filamentary, temperature-resistant binding means that is guided without kinking between adjacent ones of said modules, and extends from a surface of said heat shielding cladding that is remote from said wall means, to said wall means.

2. A heat shielding cladding according to claim 1, wherein said at least one filamentary binding means is helically guided.

3. A heat shielding cladding according to claim 2, wherein said at least one filamentary binding means comprises ceramic fibers.

4. A heat shielding cladding according to claim 2, wherein a surface of each of said modules intended as a hot side and remoted from said wall means is provided with slits that extend parallel to said sides in said direction parallel to wall means.

5. A heat shielding cladding according to claim 4, wherein said slits are disposed at intervals of from 50 to 100 mm.

6. A heat shielding cladding according to claim 5, wherein said slits extend about ¼ to ⅓ of the way into said modules from said hot side thereof in a direction toward said wall means.

7. A heat shielding cladding according to claim 2, wherein each of said modules is provided with further filamentary binding means of non heat-resistant material, with said further filamentary binding means being guided through at least two of said compacted fiber mat webs to interconnect said fiber mat webs and hold them together as a prestressed parallelepipedal body.

8. A heat shielding cladding according to claim 7, wherein said further filamentary binding means is guided without kinking.

9. A heat shielding cladding according to claim 7, wherein said further filamentary binding means comprises organic material.

10. A heat shielding cladding according to claim 7, wherein said further filamentary binding means is helically guided.

11. A heat shielding cladding according to claim 2, wherein each of said modules comprises:
a parallelepipedal base member formed from a plurality of held-together first fiber mat webs; and
on a surface of said base member that faces away from said wall means, at least one further member, which is formed from second fiber mat webs that have a different composition than said first fiber mat webs, with said at least one further member being secured to said base member by a further filamentary, heat-resistant binding means that is guided without kinking.

12. A heat shielding cladding according to claim 2, wherein said further filamentary binding means is helically guided.

13. A heat shielding cladding according to claim 12, wherein said further filamentary binding means comprises ceramic fibers.

* * * * *

UNITED STATES PATENT AND TRADEMARK OFFICE
CERTIFICATE OF CORRECTION

PATENT NO.  : 5,384,804
DATED       : Jan. 24, 1995
INVENTOR(S) : Riedel et al

It is certified that error appears in the above-identified patent and that said Letters Patent is hereby corrected as shown below:

On the title page:

[73] Assignee:   Gossler Feuerfest- und Isoliertechnik GmbH, Reinbek, Germany

Signed and Sealed this

Twenty-fifth Day of June, 1996

Attest:

BRUCE LEHMAN

Attesting Officer    Commissioner of Patents and Trademarks